Feb. 2, 1960  D. L. THECKSTON  2,923,022
HEATED WINDSHIELD WIPER BLADE
Filed Nov. 12, 1957

Dana L. Theckston
INVENTOR.

United States Patent Office 2,923,022
Patented Feb. 2, 1960

2,923,022

HEATED WINDSHIELD WIPER BLADE

Dana L. Theckston, Seattle, Wash.

Application November 12, 1957, Serial No. 695,738

1 Claim. (Cl. 15—250.5)

This invention relates generally to windshield wiper blades and more particularly to a windshield wiper blade for automobiles containing a heating element for functioning as a defroster.

It is the principal object of this invention to provide a novel construction of automobile windshield wipers which include defrosting elements as part thereof.

It is a more particular object of the invention to provide more efficient and less expensive wiper blade heating than heretofore known.

It is a still further object of this invention to provide both simple mechanical and electrical means for defrosting the windows of an automobile.

The particular novelty of this invention lies in the specific arrangement utilized for heating the front windows of an automobile to remove frost and ice therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
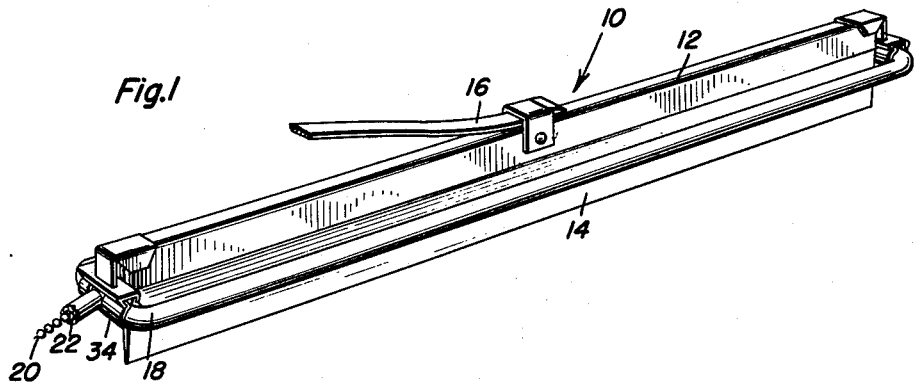
Figure 1 shows a perspective view of the invention including the wiper holder, the wiper blade, and the heating attachment.

Referring initially to Figure 1, the numeral 10 generally designates the entire wiper assembly having holder portion 12 made of an electrically conductive material and wiper portion 14 generally constructed of rubber. Numeral 16 generally shows the attaching means for attaching the wiper assembly 10 to wiper pivotal means of an automobile (not shown). An insulative tube 18 is shown surrounding the peripheral surface of the wiper blade 14. A ball chain 20 is shown entering the plastic tube 18 at aperture 22.

Figure 2:
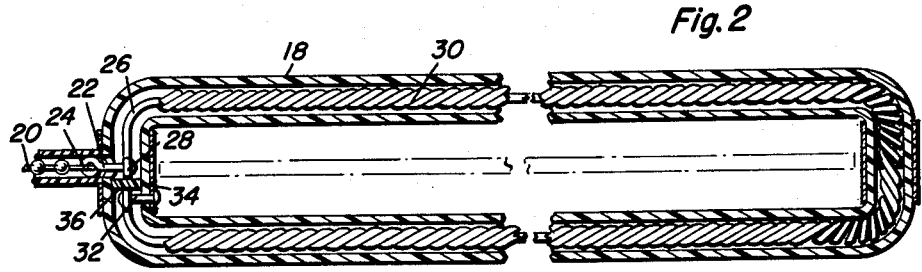
Figure 2 shows a sectional view of the invention through the heating element.

Referring now more specifically to Figure 2 the ball chain 20 is shown attached to a copper post 22 having eye end portion 24. The copper post is mechanically and electrically connected to a length of nichrome wire 26 at one end of the wire 28. The nichrome wire 26 is shown centered in the insulative tube 18 and generally the full length thereof. Helically surrounding the nichrome wire 26 is insulated copper wire 30. At the opposite end of nichrome wire 26 is attached a copper post 32 which is further electrically connected to a clamping member 34. A Bakelite insulator 36 is shown located in the tubing 18 between the two copper post members 22 and 32.

Ball chain 20 is connected to the outside of an automobile battery and supplies current through copper post member 22 to nichrome wire 26 and then to copper post member 32, to clamp member 34 which is naturally grounded through holder 12. When the current passes through a wire such as nichrome, immediate heating results due to the resistive nature of the wire from the electrical energy loss in view thereof.

Figure 3:
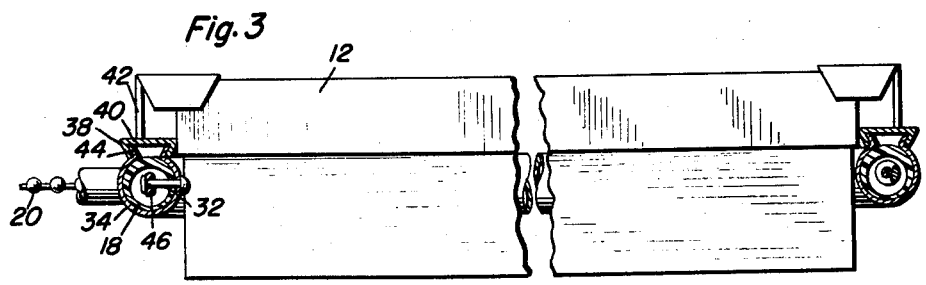
Figure 3 shows a side sectional view of the invention illustrating in detail the terminal connection and attaching means.

Referring now more specifically to Figure 3, the clamp member 34 can clearly be seen encircling the insulative tube 18 and held in place by a metallic retainer 38. The retainer 38 is in turn welded at 40 to an end of the metallic holder 12. As can clearly be seen in Figure 3 metallic holder member 12 has a depending end portion 42 which is welded at 40 to the horizontal retaining surface 38. Said retainer is in the form of an inverted U and resiliently retains end portions 44 of clamp member 34. Copper post 32 and likewise copper post 22 are fixed to the end portions of nichrome wire 26 by the formation of an eye in each end of the nichrome wire 26 as is shown at 46.

With the construction of the present invention it will be noticed that in summer weather or in areas where no frost is likely the heating attachment may be disconnected from the wiper assembly by compression of end portions 44 of clamp member 34 and ultimate release from retainer 38.

Figure 4:
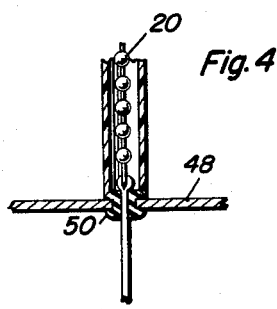
Figure 4 shows a sectional detail view of the connection between the heating element and the automobile.

Figure 4 shows ball chain 20 entering the automobile 48 and insulated therefrom by an insulated bushing 50. The electrical connection would extend from the ball chain to a switch (not shown) located under the dashboard. The heating device then may be actuated at will by the operator of the automobile simply by closing a switch within the car which would connect ball chain 20 to the live side of the automobile battery and thence carry current through the heating element in the form of a nichrome wire 26 to ground through clamping member 34 and the metallic holder 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

The combination of a windshield wiper and a heating attachment comprising a windshield wiper having a rubber blade and an electrically conducting holding portion, a heating attachment comprising an endless hollow insulative tube, a wire within said tube, electrical source means, connecting means for connecting said wire to said source and attaching means to attach said heating attachment about the periphery of said rubber blade, said connecting means including a ball chain attached to one end of said wire, another end of said wire being electrically connected to said holding portion, said attaching means including a pair of resilient clamps carried by said endless tube and a pair of retainers adapted to receive said clamps carried by said holding portion.

References Cited in the file of this patent

UNITED STATES PATENTS

| | | |
|---|---|---|
| 946,779 | Hubbell | Jan. 18, 1910 |
| 1,611,749 | Himmelman | Dec. 21, 1926 |
| 1,622,416 | Burton | Mar. 29, 1927 |
| 1,640,886 | Davis | Aug. 30, 1927 |
| 1,694,390 | McColley | Dec. 11, 1928 |
| 1,768,727 | Yonan | July 1, 1930 |
| 2,047,231 | Shannon | July 14, 1936 |
| 2,433,239 | Rasero | Dec. 23, 1947 |
| 2,536,940 | Johnson et al. | Jan. 2, 1951 |
| 2,627,011 | Eaves | Jan. 27, 1953 |
| 2,733,472 | Karstens et al. | Feb. 7, 1956 |
| 2,786,224 | Dembosky | Mar. 26, 1957 |